Oct. 27, 1931.  A. G. PERKINS  1,829,236

PIPE JOINT

Filed March 15, 1927

Inventor
Albert G. Perkins,
by Geyer & Geyer
Attorneys.

Patented Oct. 27, 1931

1,829,236

UNITED STATES PATENT OFFICE

ALBERT G. PERKINS, OF BUFFALO, NEW YORK

PIPE JOINT

Application filed March 15, 1927. Serial No. 175,490.

This invention relates to improvements in pipe joints and more particularly to a flexible root-proof joint intended for use in connection with sewer pipes.

Its chief object is the provision of a simple and inexpensive root-proof joint for concrete and vitrified pipe which is constructed to guard against entrance of roots, surface water and sand into the pipes at the joints, which permits the expansion and contraction of the pipe-sections, and which allows them to flex at the joints and become misalined in order to adapt themselves to irregularities of the ground.

Other objects of the invention are to produce a flexible joint having means for spacing the opposing ends of the pipe-sections to allow for expansion and contraction, which is so constructed that it will readily adapt itself to attachment to the pipe-sections regardless of their surface variations and thereby permit them to be easily and quickly assembled, which will adapt itself to bends or irregularities in the trench in which the pipes are laid, and which is positively root-proof.

In the accompanying drawings:—

Figure 1:
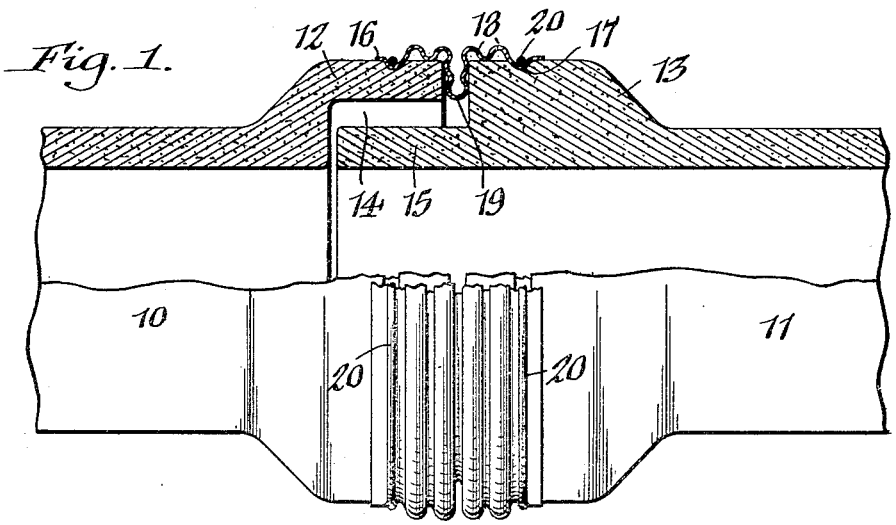
Figure 2:
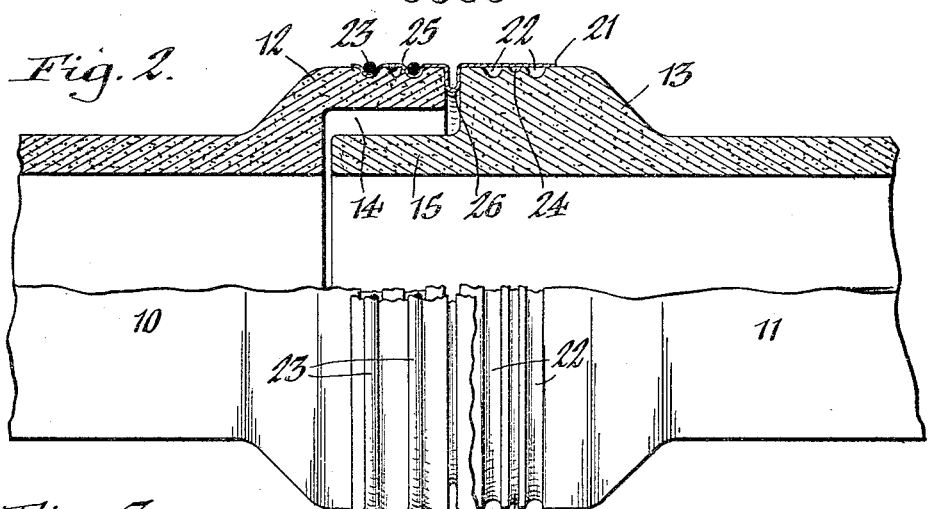
Figure 3:
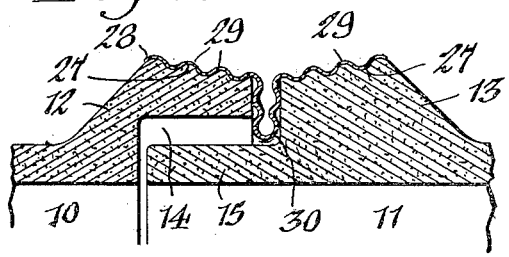
Figure 4:
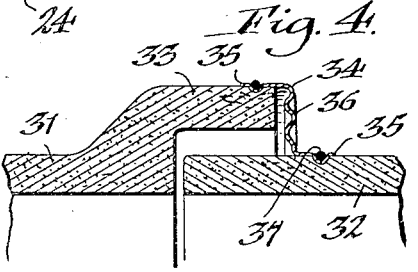
Figure 5:
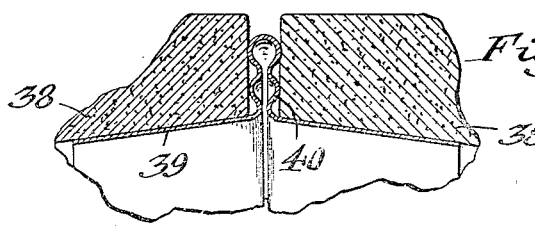

Figure 1 is a fragmentary sectional elevation of two pipe-sections showing my improved joint applied thereto. Figure 2 is a similar view of a modified form of the joint. Figures 3, 4 and 5 are fragmentary longitudinal sections of other modifications of the invention.

Similar characters of reference indicate corresponding parts throughout the several views.

While the invention is applicable to sewer pipe lines of any well-known construction, it has been shown in the drawings, by way of example, in connection with vitrified pipe sections 10, 11 having collars or enlargements 12, 13, respectively, at their opposing ends. One end of each pipe section terminates in a bell or recess 14 and its opposite end is provided with a spigot 15 which fits loosely within the bell-end of an adjoining pipe.

Encircling the opposing ends of the pipe-section is a coupling band or sleeve 16 which may be made of copper, lead or other suitable material and which may be a split or continuous sleeve. The latter spans the gap between the joint faces of the pipe-sections and its ends are preferably seated and pressed in annular grooves 17 for reliably securing the sleeve to such sections. The main body of the sleeve between its attaching ends may be straight but it is preferably provided with a series of annular corrugations 18 which permit the expansion and contraction of the pipe-sections. Disposed substantially centrally of the sleeve is an inwardly-directed corrugated fold 19 which extends into the space between the abutting ends of the pipe-sections and forms a yieldable spacer between the latter and also permits them to flex more or less in the direction of their length and radially of the joint, and thereby compensate for any relative movement of the sections, such as misalinement thereof or lateral displacement of one section relative to another due to irregularities in the pipe-trench, or to ground vibrations or to growing roots which happen to come in contact with the pipe-sections. While performing these advantages, the joint is kept intact and not liable to become broken and it prevents sand, surface water and roots from gaining access through the joint and into the pipe. To further aid in securing the marginal attaching ends of the sleeve 16 to the pipe-sections, clamping wires 20 may be employed. It will be noted that the fold 19 of the sleeve extends an appreciable distance into the space between the opposing pipe-sections and its side walls bear against the end faces thereof.

In the modified form of the invention shown in Fig. 2, the joint is intended for pressure pipe lines and to that end consists of a sleeve 21 whose marginal attaching portions are adapted to be rolled or pressed by a suitable tool into annular grooves 22 formed in the pipe-sections and securely fastened therein by clamping rods or wires 23. Two of such grooves are preferably arranged in each pipe section, as shown, and between each pair is a somewhat shallower groove 24 for receiving a suitable compressible packing 25 which is firmly pressed into place at the time the coupling sleeve is applied to the pipe-sections. This embodiment also includes the inwardly-directed fold 26 extending into the space between the pipe-sections for the purpose previously described.

In the embodiment of the invention shown in Fig. 3, the collars 12, 13 of the pipe-sections are tapered in opposite directions and are provided with threads 27 with which the coupling sleeve 28, having corresponding threads 29, is adapted to engage. The construction is such that the sleeve pinches the threaded collars on their outer ends more so than it does on their inner ends affording a quick jointing of the sleeve to the pipe-sections by a fractional turn of the former, and the corrugated fold 30 permits the sections to expand and contract and to flex or become misalined. A suitable sealing material, such as cement or the like, may be applied to the contact faces of the pipe-sections and the coupling sleeve to reliably seal the joint.

In Fig. 4, the joint is shown connecting two ordinary sewer pipe-sections 31, 32. The bell end 33 of the section 31 and the opposing end of the section 32 are joined by a coupling sleeve 34 having marginal attaching flanges 35, 35 of different diameters and a corrugated web portion 36 which permits the relative movements of the pipe-sections. Clamping wires 37 serve to anchor the attaching flanges of the sleeve to said sections.

If desired, the improved joint may be arranged internally of the pipe-sections in the manner shown in Fig. 5. In this case, the opposite ends of the pipe-sections 38, 38 are flared or tapered inwardly on their inner sides for receiving the attaching portions of the coupling sleeve 39 which has an outwardly directed corrugated fold 40 arranged between the opposing ends of said sections. The coupling sleeve may be pressed into place and fastened to the pipe-sections in any suitable manner, or the same may be connected thereto by internal threads similar to the construction shown in Fig. 3. This form of joint may be used to advantage in high pressure pipe-lines, the pressure exerted on the walls of the sleeve forcing the same against the pipe and reliably holding it in place.

I claim as my invention:—

1. In a joint of the character described, the combination of a pair of spaced pipe-sections, and a coupling sleeve of flexible metal having attaching portions at its ends fitted over the opposing ends of said sections and provided intermediate its ends with an inwardly-directed fold arranged in the space between said sections for interlocking engagement therewith, the side walls of the fold having concentric corrugations and normally bearing against the end faces of the respective pipe-sections and forming a spacer therebetween and permitting them to flex freely to compensate for relative movements of the pipe-sections.

2. A flexible sheet metal coupling sleeve for pipes, having threaded attaching portions tapering inwardly from their outer edges toward the intermediate portion thereof, and an inwardly-directed fold formed integral with the sleeve between the threaded portions thereof, the walls of said fold being provided with annular corrugations and adapted to overlie the abutting ends of adjoining pipes.

3. In a joint of the character described, the combination of a pair of pipe-sections in approximately abutting relation and having the exterior of their opposing attaching ends tapered in opposite directions toward the plane of the joint, a flexible coupling sleeve applied to the opposing ends of said sections and having their attaching portions correspondingly tapered, and complementary interlocking means on the tapered portions of the pipe-sections and the coupling sleeve.

4. In a joint of the character described, the combination of a pair of pipe-sections in approximately abutting relation and having the exterior of their opposing attaching ends tapered in opposite directions toward the plane of the joint and threaded, and a sheet metal coupling sleeve applied to the opposing ends of said sections and having their attaching portions correspondingly tapered and threaded.

5. In a joint of the character described, the combination of a pair of pipe-sections in approximately abutting relation and having collars at their opposing ends, the external faces of said collars tapering in opposite directions toward the plane of the joint and being threaded, and a flexible coupling sleeve of sheet metal having outwardly flaring attaching portions at its ends threaded to receive said collars.

ALBERT G. PERKINS.

CERTIFICATE OF CORRECTION.

Patent No. 1,829,236.            Granted October 27, 1931, to

ALBERT G. PERKINS.

It is hereby certified that error appears in the printed specification of the above numbered patent requiring correction as follows: Page 2, lines 57 and 58, claim 1, strike out the words "for interlocking engagement therewith" and insert the same to follow "sections" line 54, of same claim; and that the said Letters Patent should be read with this correction therein that the same may conform to the record of the case in the Patent Office.

Signed and sealed this 8th day of December, A. D. 1931.

(Seal)

M. J. Moore,
Acting Commissioner of Patents.